Sept. 4, 1945.   M. WATTER   2,384,409
AIRFOIL STRUCTURE FOR AIRCRAFT
Filed March 6, 1943   4 Sheets-Sheet 1
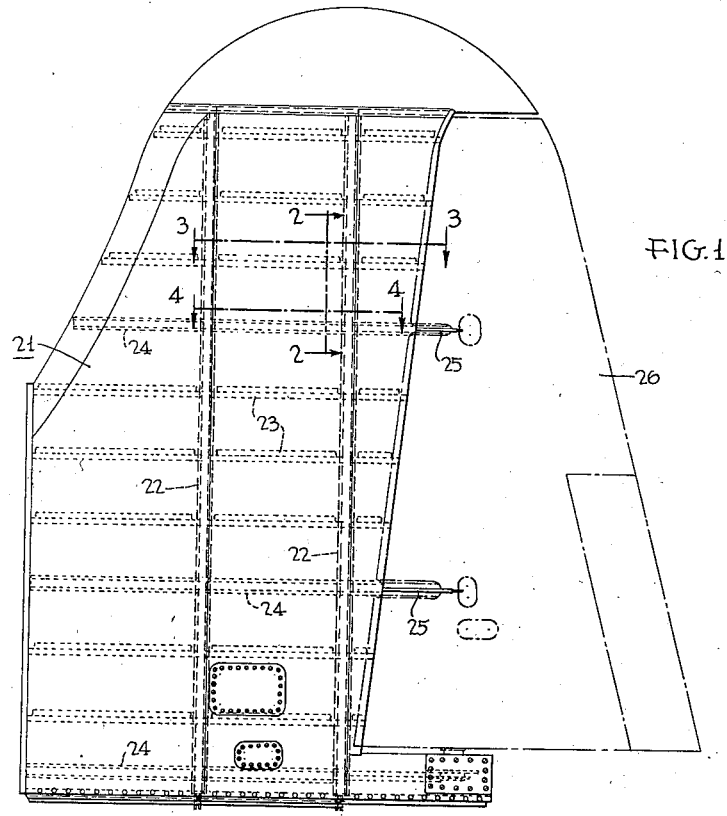
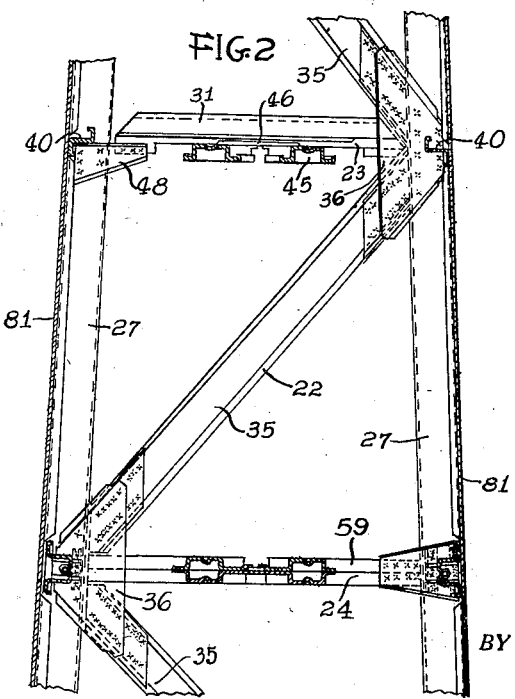
INVENTOR
Michael Watter.
BY John P. Tarbox
ATTORNEY Sept. 4, 1945.   M. WATTER   2,384,409
AIRFOIL STRUCTURE FOR AIRCRAFT
Filed March 6, 1943   4 Sheets-Sheet 2
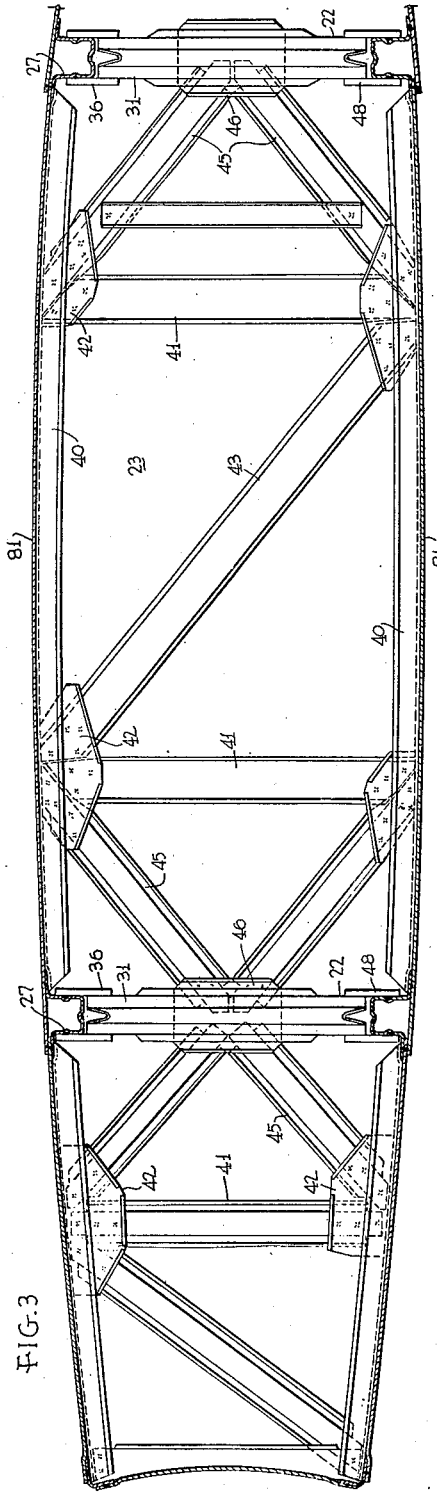
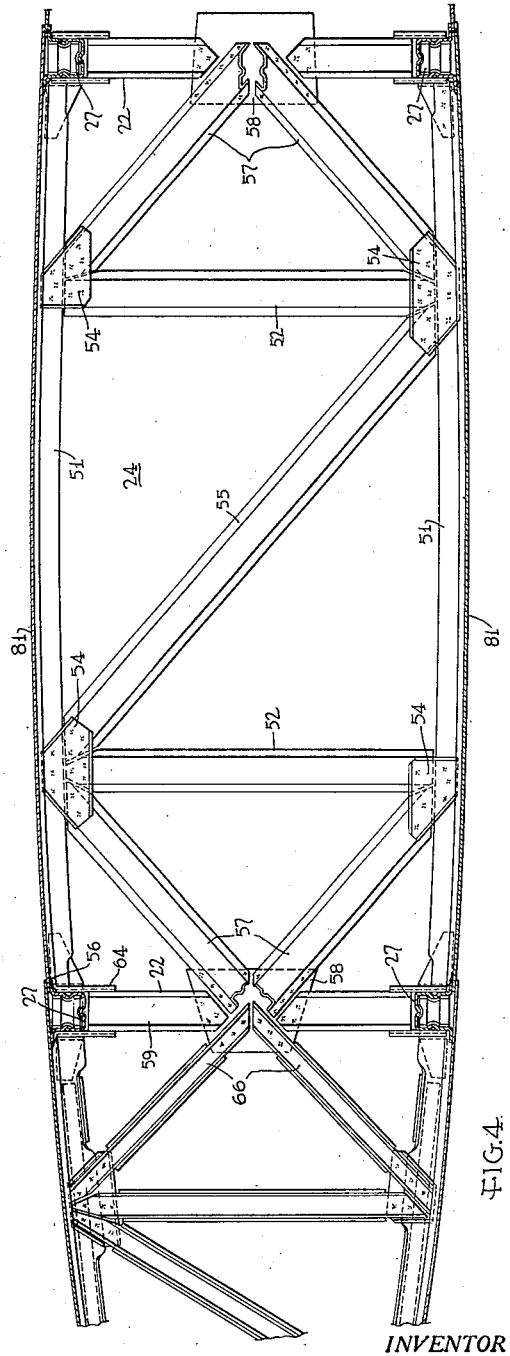
INVENTOR
Michael Watter
BY  *John P. Tarbox*
ATTORNEY Sept. 4, 1945. M. WATTER 2,384,409
AIRFOIL STRUCTURE FOR AIRCRAFT
Filed March 6, 1943 4 Sheets-Sheet 3
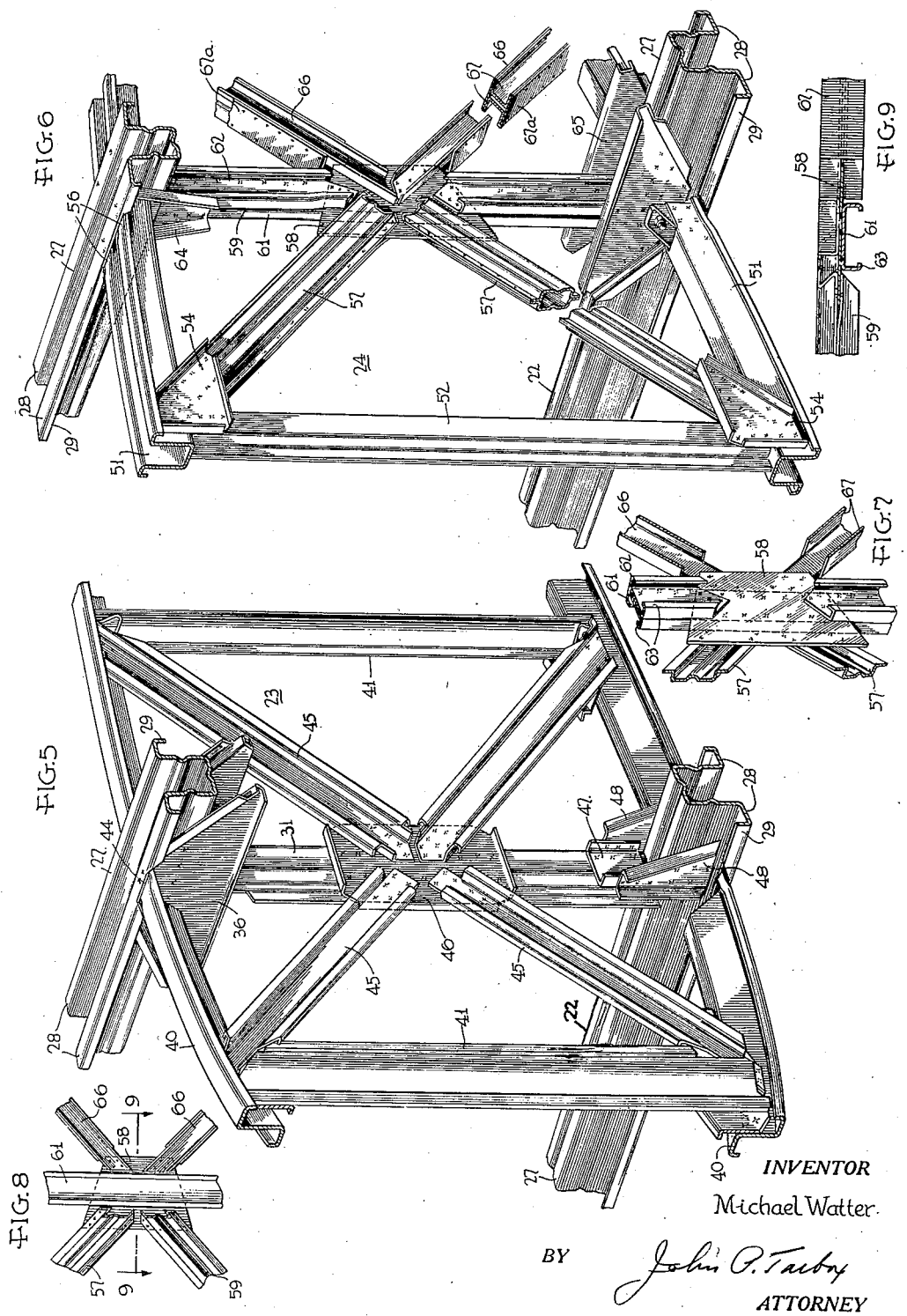
INVENTOR
Michael Watter.
BY John P. Tacby
ATTORNEY Sept. 4, 1945. M. WATTER 2,384,409
AIRFOIL STRUCTURE FOR AIRCRAFT
Filed March 6, 1943 4 Sheets-Sheet 4
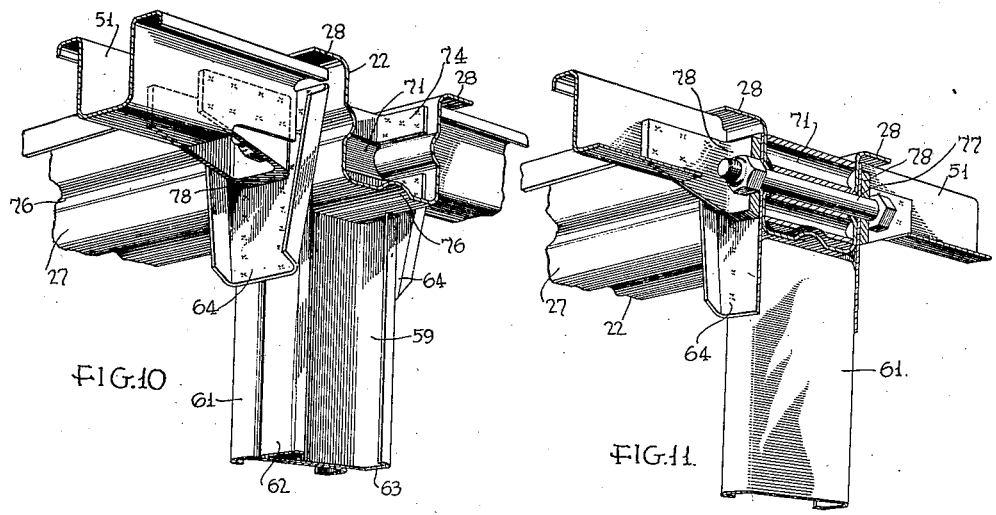
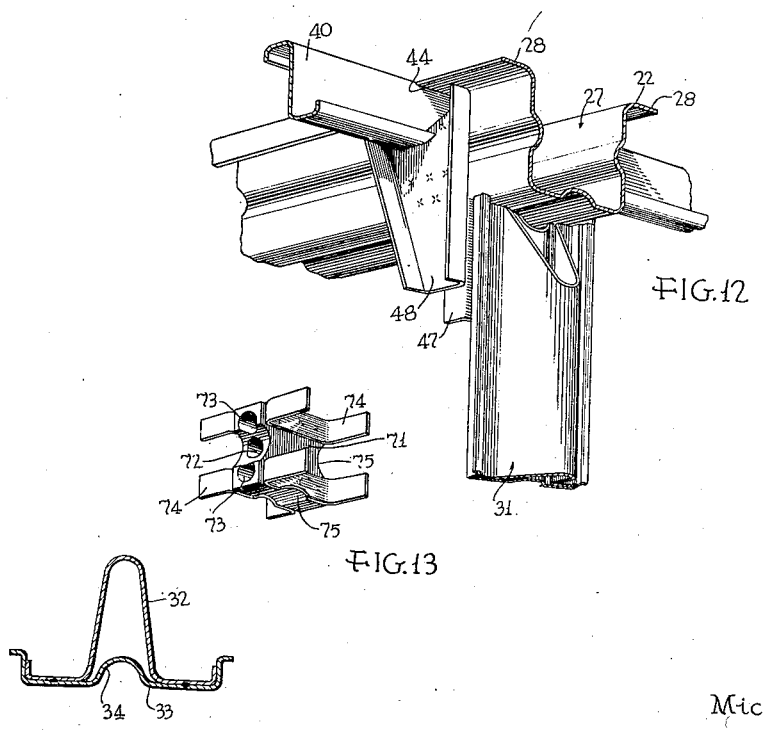
INVENTOR
Michael Watter.
BY John P. Tarbox
ATTORNEY Patented Sept. 4, 1945

2,384,409

UNITED STATES PATENT OFFICE 2,384,409

AIRFOIL STRUCTURE FOR AIRCRAFT

Michael Watter, Philadelphia, Pa., assignor to Edward G. Budd Manufacturing Company, Philadelphia, Pa., a corporation of Pennsylvania Application March 6, 1943, Serial No. 478,228

5 Claims. (Cl. 189—36)

This invention relates generally to load carrying structures and more especially to airfoil structures such, for example, as the wings, stabilizers, fins, or the like forming the air reaction surfaces of aircraft.

An object of this invention is to provide a structure capable of use as an airfoil which is adapted to be made, if desired, entirely of stainless steel and which is constructed and arranged to provide the utmost strength consistent with lightness of weight.

A further object is to provide an airfoil structure in which through-running spars are associated with crosswise extending ribs which, interrupted at the planes of the spars, are so joined as to produce the effect and gain the advantages of uninterrupted, structural continuity.

A further object is to provide an airfoil structure in which through-running spars and crosswise extending ribs are so joined together that rib stresses are transferred to the spar at regions intermediate its chord members to minimize the concentration of stresses at the connections of the spar chord members with the airfoil skin.

A further object is to provide an improved joint construction particularly adapted for use between the main frame members of an airfoil structure, arranged to permit securing the parts together entirely by welding, the arrangement being such that the points to be welded are easily accessible for such operation.

These and other objects which will be apparent to those skilled in the art are accomplished by the present invention, one embodiment of which is illustrated in the accompanying drawings in which:

Fig. 1 is a view in elevation of an airfoil structure constructed in accordance with one embodiment of this invention, showing the same as forming a vertical stabilizer or fin for an aircraft.

Fig. 2 is a transverse sectional view on the line 2—2 of Fig. 1.

Figs. 3 and 4 are horizontal sections on the lines 3—3 and 4—4, respectively, of Fig. 1 showing an ordinary, typical, or non-hinge rib and a hinge rib respectively.

Fig. 5 is a perspective view of a joint between a spar and a crosswise extending rib.

Fig. 6 is a similar view showing a joint between a spar and a hinge rib, the latter being of somewhat stronger construction than the rib shown in Fig. 5 for the purpose of carrying a hinge support for a rudder mounting.

Fig. 7 is a perspective view of the joint shown in Fig. 6 illustrating the connection between a strut of the spar member and the diagonals of the rib, parts of the diagonals being removed.

Fig. 8 is a view in elevation of the opposite side of the joint shown in Fig. 7.

Fig. 9 is a transverse sectional view on the line 9—9 of Fig. 8.

Fig. 10 is a perspective view of a joint construction between the chord members of a spar and a hinge rib and including a spar strut, illustrating the way in which buckling of an associated skin blanket is prevented.

Fig. 11 is a similar view with parts in section taken on a central plane passing through the strut shown in Fig. 10.

Fig. 12 is a view of a similar joint between spar members and the chord of an ordinary rib.

Fig. 13 is a perspective view of a spacer used with the joint illustrated in Figs. 10 and 11 and, Fig. 14 is a sectional view of the strut shown in Fig. 12.

The present invention is shown for the purposes of illustration as embodied in an aircraft fin, but it will be apparent that the invention is not limited to use in such a structure but is, on the contrary, equally adapted for use in airfoil structures generally and, indeed, in structural members used for other purposes.

As illustrated, the invention is shown embodied in a fin 21 having longitudinally extending spars 22 which are continuous from end to end and transverse ribs extending crosswise of the spars, there being two types of ribs, namely, typical, ordinary, or non-hinge ribs 23 and hinge ribs 24 which are preferably of sturdier construction inasmuch as they support hinge frames 25 on which the rudder 26 is hingedly mounted. The crosswise extending ribs are each interrupted to accommodate the through-running spars, and the sections of each rib on opposite sides of the spar are given the effect of continuity by joining the rib elements to suitable elements of the spar in the plane of interruption.

Each spar, as shown in Fig. 2, includes chord members 27 preferably formed of flanged channel-sections or "hat-shaped" sections having outwardly extending flanges 28, each of which is provided along its edge with a reinforcing flange 29. The chords of each spar are connected by transversals or struts which in the plane of the typical rib illustrated in Fig. 3, 5 and 12 include vertical struts 31, shown as formed by a "sombrero-shaped" member 32 and a flanged plate 33 welded to the spaced flanges of the member 32 and having a longitudinally extending corrugation 34. The spar chords are also connected by diagonal transversals or struts 35 welded at their ends to triangular gusset plates 36 which are in turn welded to the outer faces of the side walls of the channels forming the chords 27. For clarity of illustration, the diagonals 35 are shown only in Fig. 2, being omitted from Figs. 5 and 6.

The chord members 40 of the typical ribs 23 (Fig. 3) are connected by transversals in the form of vertical struts 41 welded at each end to gussets 42 secured by welding to the vertical walls of the chords, and by diagonal struts 43 of flanged channel section secured to the same gussets.

In the planes of the through-running spars, each rib is interrupted to accommodate the spar, and the sections thereof are connected to each other through the spar structure to give the effect and obtain the benefit of continuity by joinder of the rib elements, the interrupted chords and diagonals, to suitable elements on the through-running spar. At the same time the arrangement is such that a large portion of the shear and compression stresses are conducted into the spar to its transverse struts rather than to its chord members.

As illustrated in Figs. 5 and 12, a depression or end joggle 44 is formed in the face of the rib chord 40 and this end is welded to the inner side of the adjacent flange 28 of the spar chord 27, the reinforcing flange 29 being cut away in a notch as illustrated in Fig. 5 to accommodate the rib chord 40. The other section of the rib chord is similarly connected to the flange 28 on the opposite side of the spar chord 27. The interrupted diagonals 45 of each rib section are welded to a gusset plate 46 welded to the strut 31 of the spar. As shown in Fig. 5, the "sombrero-shaped" strut 31 has a flanged gusset plate 47 welded thereto and gussets 48 are welded to each side wall of the spar chord 27 in planes at right angles to the body of the gusset 47 and are welded to the flanges thereof.

Each hinge rib, Figs. 4 and 6, comprises chord members 51 of flanged channel section connected by transversals in the form of vertical struts 52 formed by pairs of flanged channels having their flanges secured together as by welding, the ends of the struts being welded to triangular gussets 54 which are in turn welded to the side walls of the chords 51. The chords are also connected by diagonal struts 55, similar to the struts 52, connected by welding to the gussets 54.

Like the typical ribs, each hinge rib 24 is interrupted at the plane of the through-running spar to accommodate the spar and the sections of the rib are connected to each other through the spar structure. As illustrated in Figs. 4 and 6, depressions or end joggles 56 are formed in the flanges of the hinge rib chord 51, and this end is welded to the underside of the adjacent flange 28 on the spar chord 27, the reinforcing flange 29 being cut away in a notch as illustrated to accommodate the chord member. The other section of the hinge rib chord is similarly connected to the flange 28 on the opposite side of the chord member 27. The interrupted diagonals 57 of one hinge rib section are welded to a gusset plate 58 welded to the strut 59 of the spar. The interrupted diagonals 57 are similar to the diagonals 55, being formed of two flanged channel sections connected face to face by welding the flanges thereof together. The strut 59 is formed by a pair of channel sections 61 and 62, welded together back to back, each section having inturned reinforcing edge flanges 63. The strut 59 is connected to the upper spar chord 27 by gusset plates 64 welded to the sides of the spar and to the side wall of the chord, there being a gusset plate on each side thereof. The strut is connected to the lower chord by being similarly welded to triangular gusset plates 65 which are in turn welded to the side wall of the lower chord. The channel member 61 of the strut extends continuously from end to end and is welded to the gusset 58. The member 62 of the strut is interrupted at the gusset plate and the interrupted ends thereof are shaped to accommodate the edges of the plate, such ends being welded thereto as shown in Fig. 6.

The other section of the hinge rib is provided with interrupted diagonals 66 each of which is preferably formed by a pair of simple channel sections 67, see Fig. 6, connected together by side plates 67a welded to the side flanges of each channel. The side plates 67a terminates short of the ends of the diagonals which are shaped so as to accommodate the gusset plate 58 between them, being welded thereto. The manner of securing the diagonals to the trailing edge chord section and the detailed construction of such parts form no part of the present invention and need not be described herein.

Means is provided not only for reinforcing and rendering rigid the joint between the through-running chords 27 of the spar and the chord sections of the hinge ribs connected thereto, but also to increase the effect of structural continuity between the interrupted chords of the hinge ribs. This serves to prevent any such distortion of the parts at the joint as would produce buckling of the skin blanket which is smoothly contoured over the joint. As illustrated in Figs. 10, 11 and 13, a spacer block 71 having a bolt hole 72 extending through the center thereof and parallel holes 73 for lightening the structure, and also having laterally extending wings 74 welded to the upper and lower edges, is bolted in place within the channel of the chord member 27 with the wings 74 welded to the inner side walls thereof. The sides and bottom of the spacer have recesses 75 to accommodate the longitudinal corrugation 76 formed in the side walls and web of the chord channel 27. A clamping bolt 77 extends through the bolt hole 72, through the side walls of the chord member 27 and through the webs of double angle plates 78 which are thus securely clamped against the outer walls of the chord. Each wing of each angle plate is welded to the inner face of the channel forming the hinge rib chord 51.

A skin blanket 81, of sheet material, preferably stainless steel, is stretched across the chord members of the various spars and ribs and welded thereto. The joints between the chord members of the spars and ribs constructed as described, present substantially continuous skin supporting surfaces over which the skin blanket can be smoothly contoured and to which it can be easily secured by conventional welding operations. The entire structure can be formed of stainless steel. The manner of connecting the different sections of the ribs to the through-running spars not only gives the effect of mechanical continuity throughout each given rib element while permitting through-running spars, but also provides a construction in which shearing stresses upon the spars where the ribs cross are carried away through the rib chords and diagonals forming the joint between the rib sections at the plane of the through-running spar.

A new and advantageous feature of the invention described resides in interconnecting the ends of the endmost transverse members of the ribs through the convergent diagonal members with the spar transverse members at a region intermediate the ends thereof. It is customary practice to provide a compression diagonal of a rib which connects with a chord member of the spar. In such constructions used in connection with a spar chord member of channel section, the compression forces in the diagonal tend to flex the side wall of the spar chord member, resulting in the production of buckles in the portion of the skin which spans the chord member flanges. It will be noted in the present invention that such tendency is minimized through the transfer of stresses to the transverse member of the spar rather than to the spar chord member.

Although I have described in detail a specific construction of airfoil illustrative of this invention, it will be apparent that such details are adapted for use in many forms of metallic structure and that the invention can be variously modified and adapted within the scope of the appended claims.

What is claimed is:

1. An airfoil structure comprising in combination, a spar having chord members, a chord-connecting strut formed by a pair of channel sections secured together and having a gusset plate mounted between said sections intermediate the ends of said strut, one of said channel sections being continuous from chord member to chord member and the other being interrupted at said gusset plate, a rib extending cross-wise of said spar substantially in the plane of said strut and including chord members connected by diagonal strut members, said diagonal strut members each comprising a pair of channel members secured together along their length, each of said diagonal strut members being interrupted at said spar strut and having said gusset plate mounted between and connected to the channel members thereof.

2. A metallic airfoil structure comprising in combination, a through-running spar having channel-shaped chord members and struts interconnecting said members, and a cross-wise extending rib including separate sections disposed at opposite sides of said spar, each section including channel-shaped chord members, each chord member of one rib section being aligned with a chord member of the other section and being separated therefrom by a spar chord member, and means providing rigid structural continuity between the aligned rib chord members, said means comprising stirrups rigidly secured within the channels of said rib chord members, a rigidifying spacer member nested in the channel of the adjacent spar chord member, and bolt means extending through the bases of said stirrups, the walls of said adjacent spar chord member and said spacer member.

3. A structural assembly comprising intersecting truss structures, one through-running and the second discontinuous at the first, the first truss comprising spaced channel-section chords open exteriorly and a strut at the intersection point with the second truss, the second truss comprising a web and spaced chords ending at the sides of the first truss chords, gusset plates secured to the sides of the channel chords and the strut to connect them, and tension and compression resistant bridging means connecting said gusset plates and said second truss chord ends across said channel chord of the first truss, said bridging connection including a compression member across the chord channel and an angled gusset secured to the intersecting truss chords.

4. A structural assembly comprising intersecting truss structures, one through-running and the second discontinuous at the first, the first truss comprising spaced channel-section chords open exteriorly and a strut at the intersection point with the second truss, the second truss comprising a web and spaced chords ending at the sides of the first truss chords, gusset plates secured to the sides of the channel chords and the strut to connect them, and tension and compression resistant bridging means connecting said gusset plates and said second truss chord ends across said channel chord of the first truss, said second truss chords being of channel section open exteriorly, and said bridging connection including a compression member in the first chord channel and stirrup gusset members secured to the ends of the second channel members and connected to each other by bolts across the first channel chord and its compression member.

5. A structural assembly comprising intersecting truss structures, one through-running and the second discontinuous at the first, the first truss comprising spaced channel-section chords open exteriorly and a strut at the intersection point with the second truss, the second truss comprising a web and spaced chords ending at the sides of the first truss chords, gusset plates secured to the sides of the channel chords and the strut to connect them, and tension and compression resistant bridging means connecting said gusset plates and said second truss chord ends across said channel chord of the first truss, said second truss chords being of channel section open exteriorly, and said bridging connection including a compression member in the first chord channel and stirrup gusset members secured to the ends of the second channel members and connected to each other by bolts across the first channel chord and its compression member, the base webs of the second channel chords being cut away at the end and the inner edge of the stirrups extending within the base webs to make the bolts accessible from the inside of the assembly.

MICHAEL WATTER.